3,108,515
METHOD AND APPARATUS FOR ERECTING FLATTENED CARTONS
Roger H. Stohlquist, Rockford, Ill., assignor to Anderson Bros. Mfg. Co., Rockford, Ill., a corporation of Illinois
Filed Aug. 1, 1962, Ser. No. 214,082
21 Claims. (Cl. 93—53)

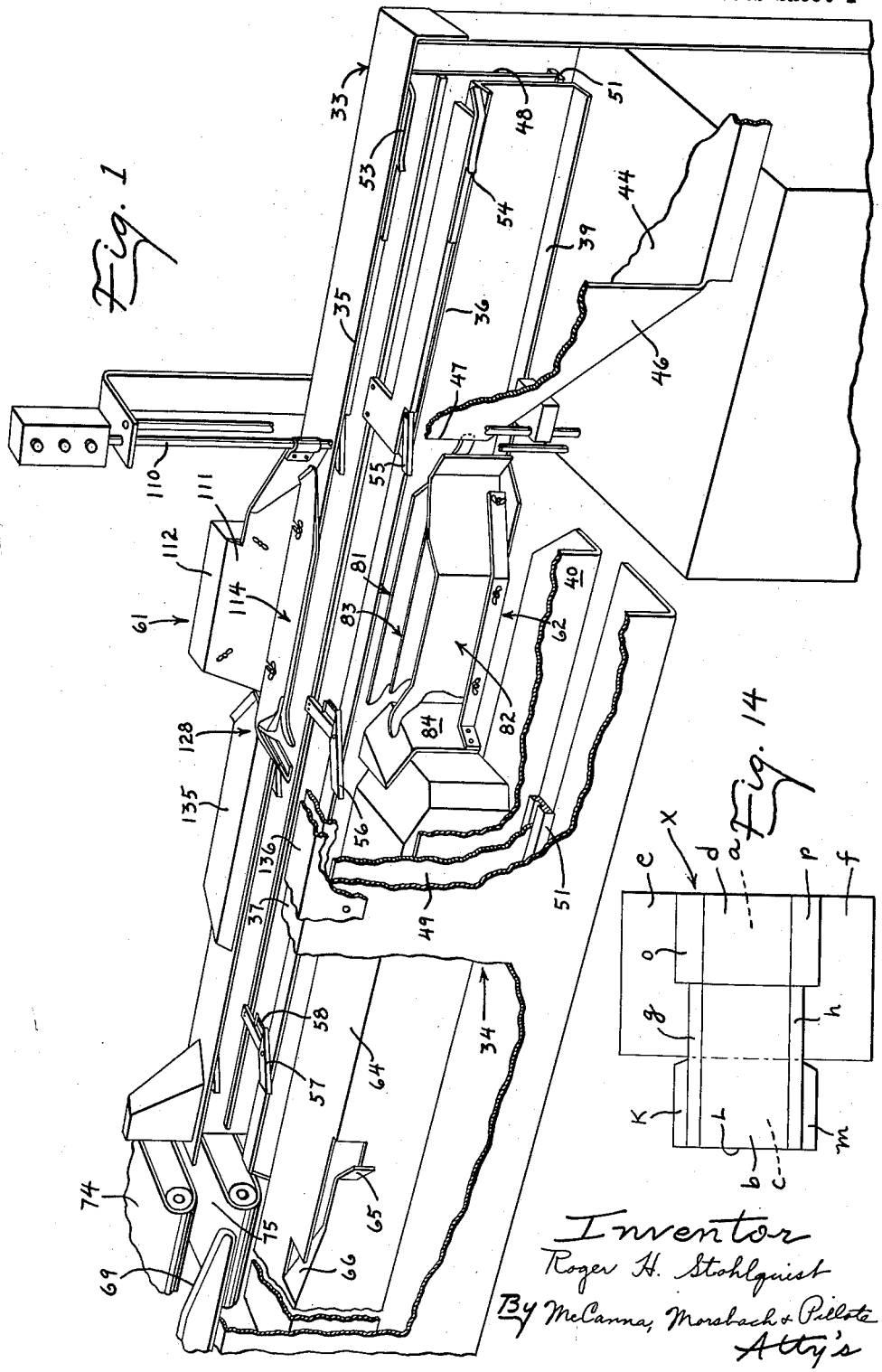

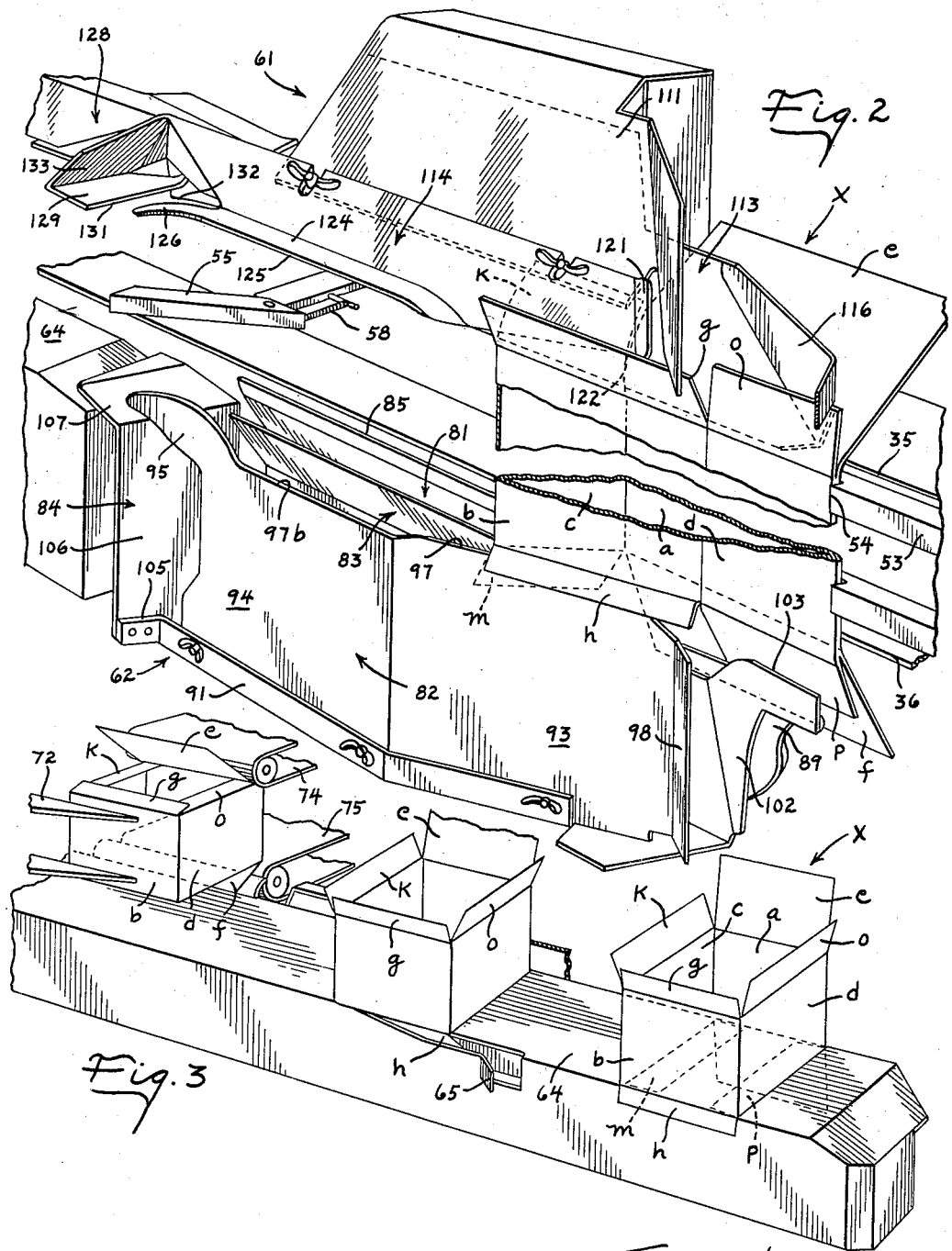

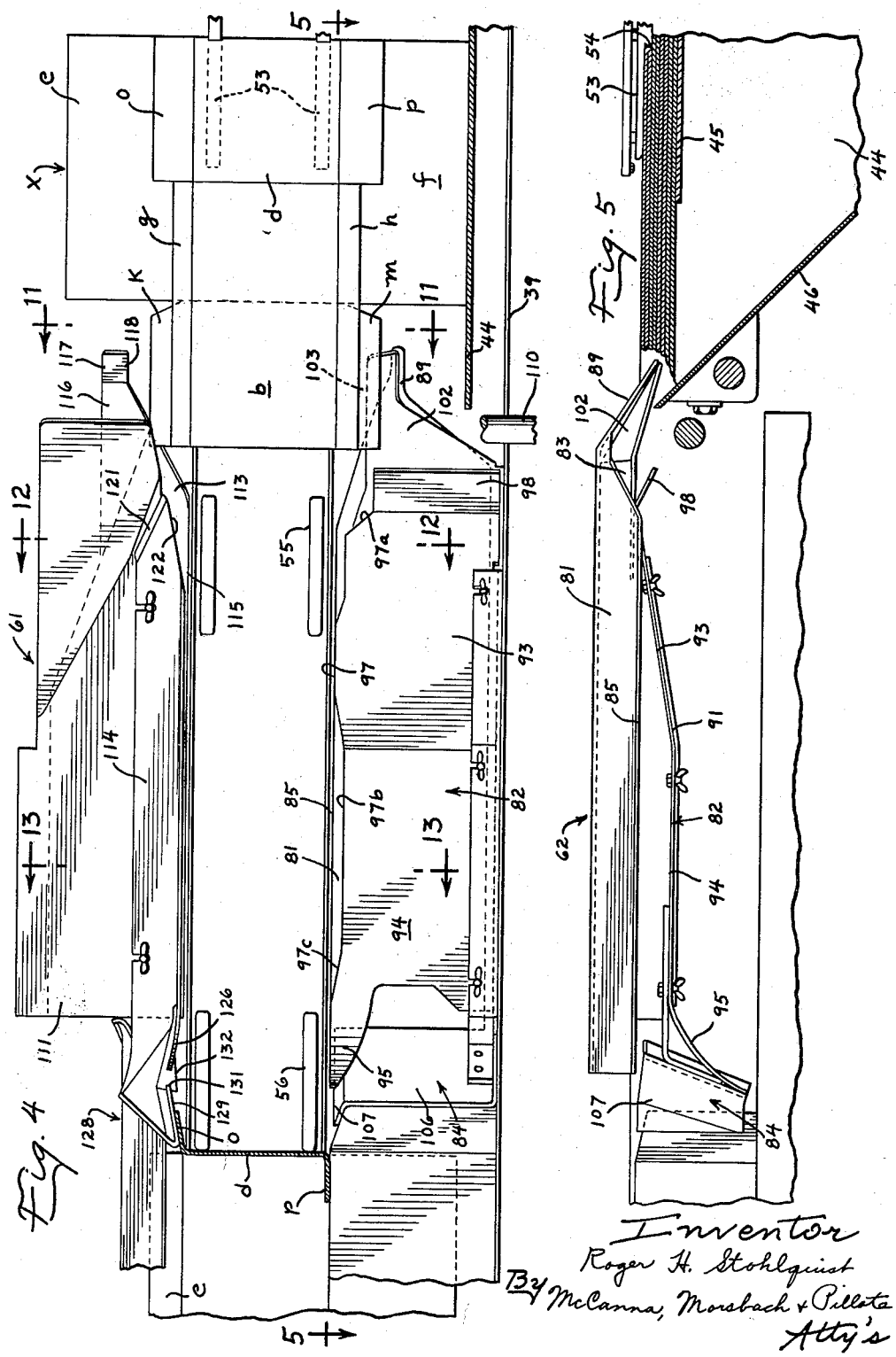

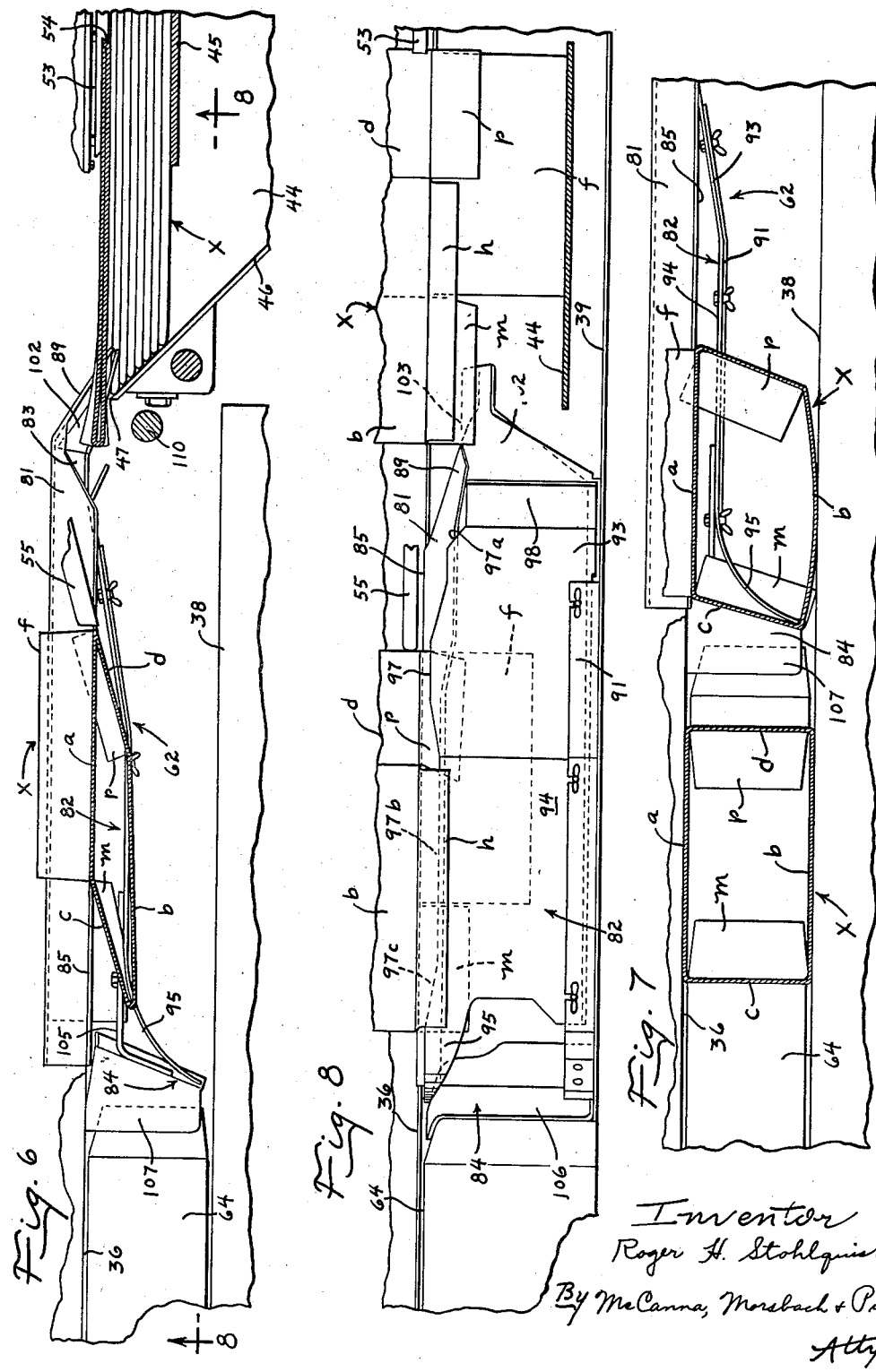

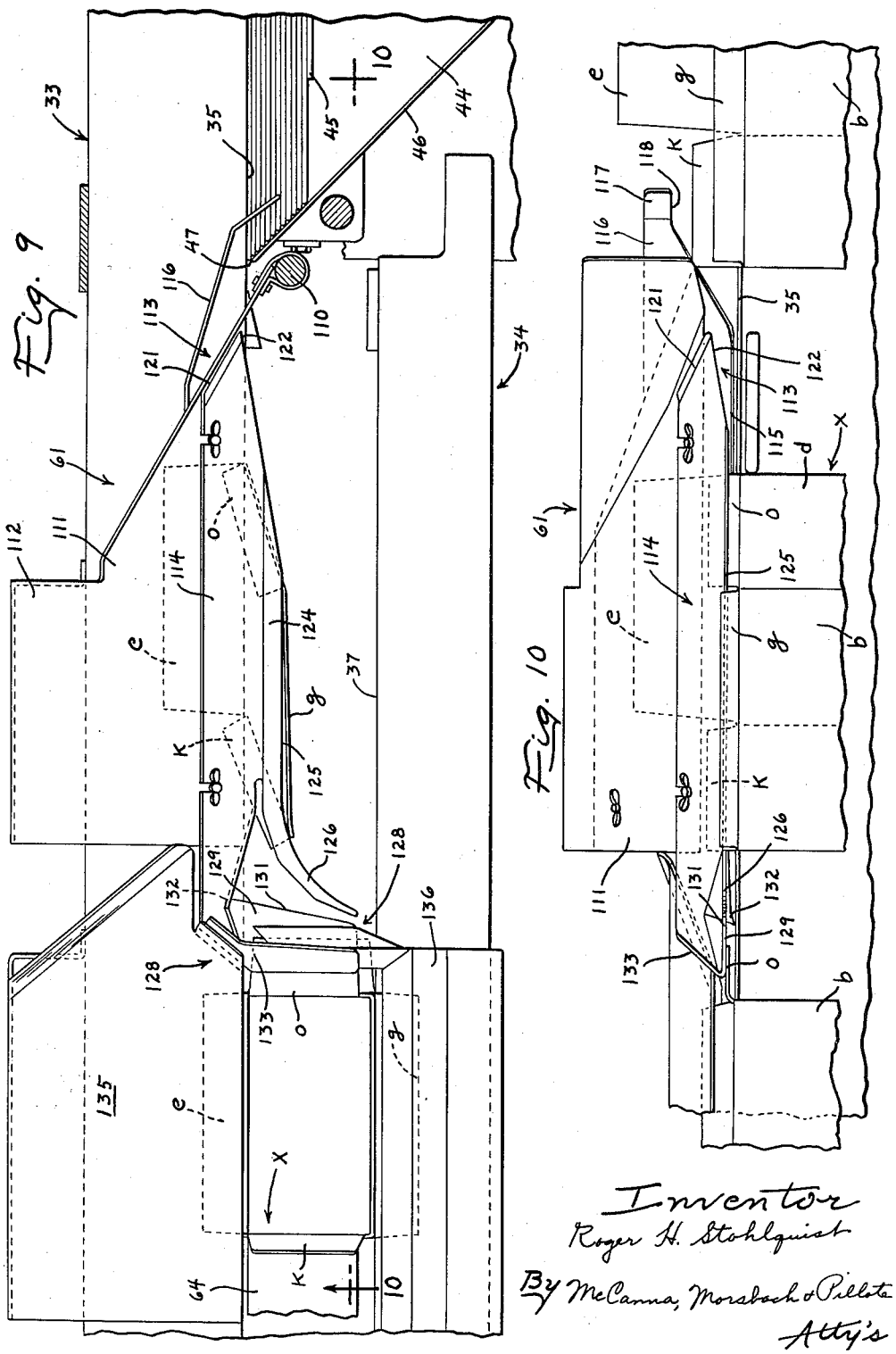

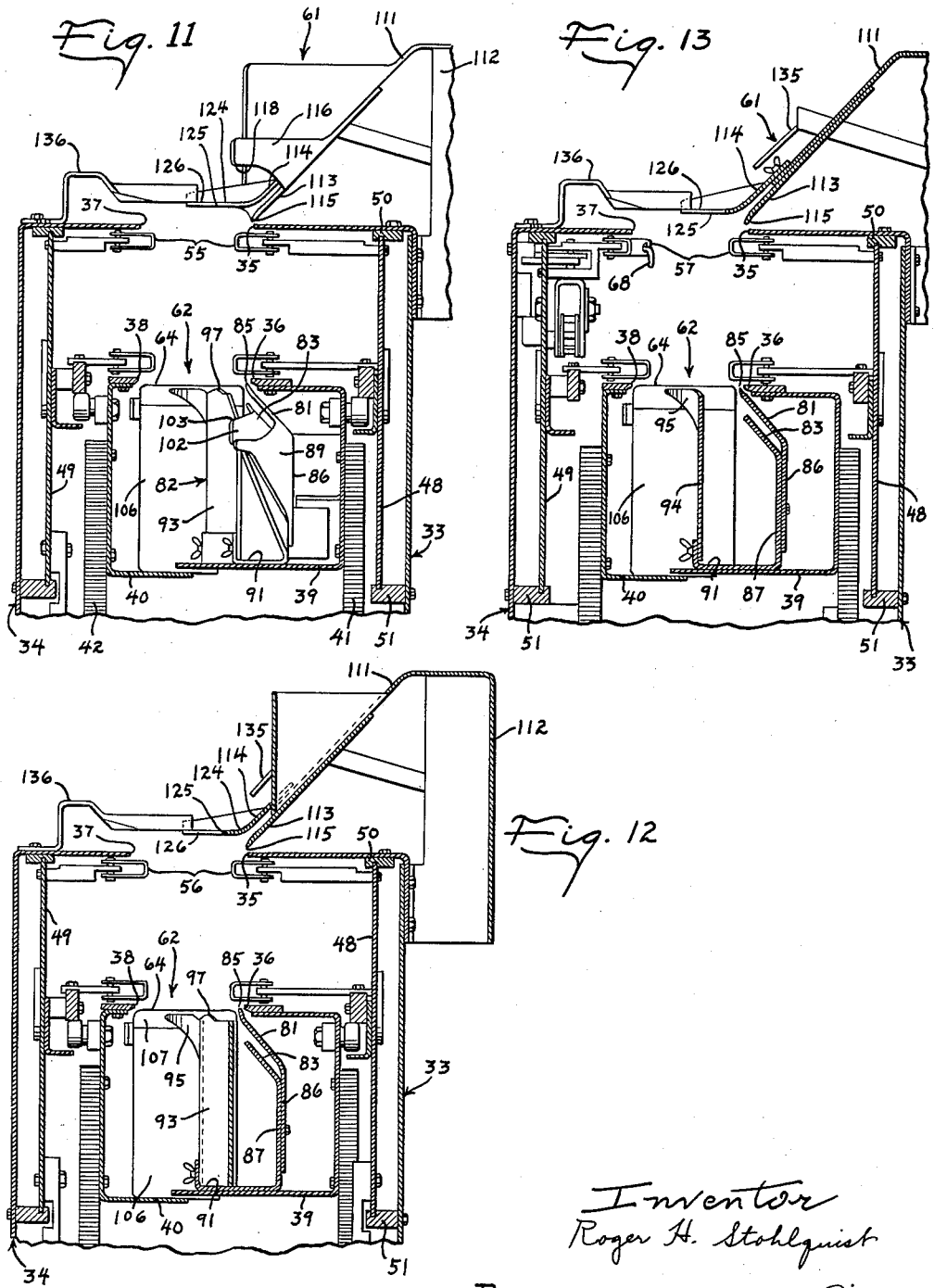

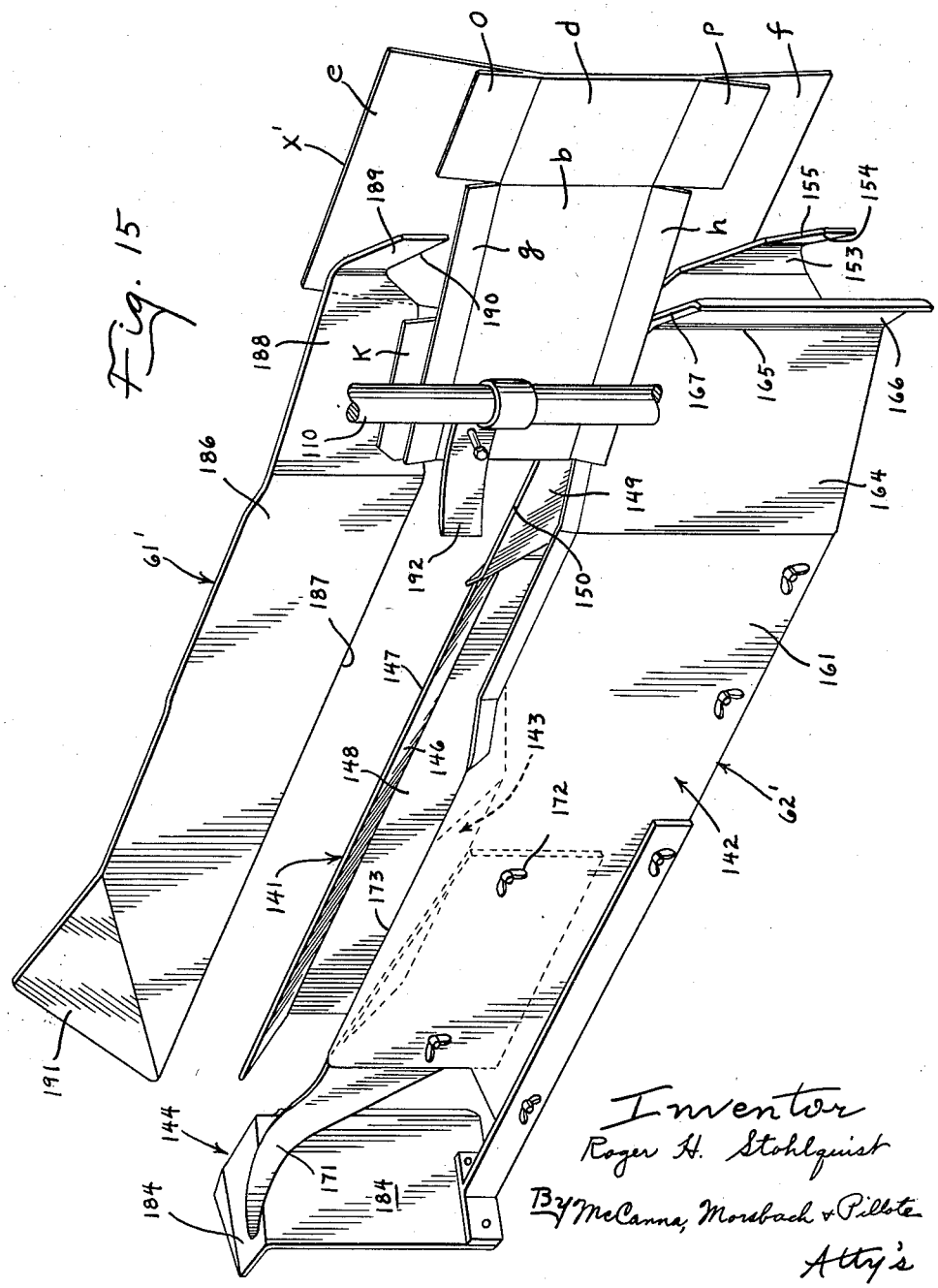

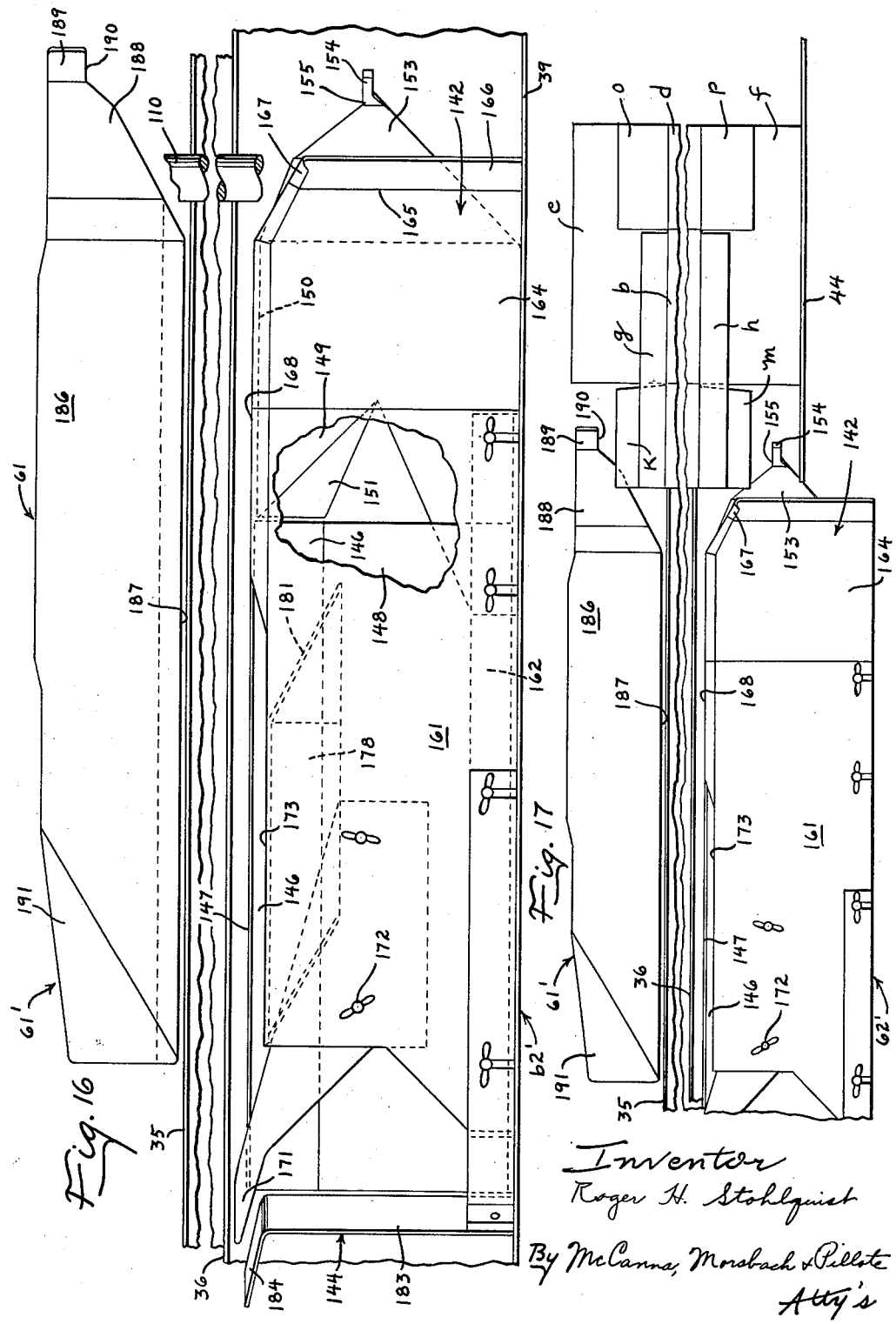

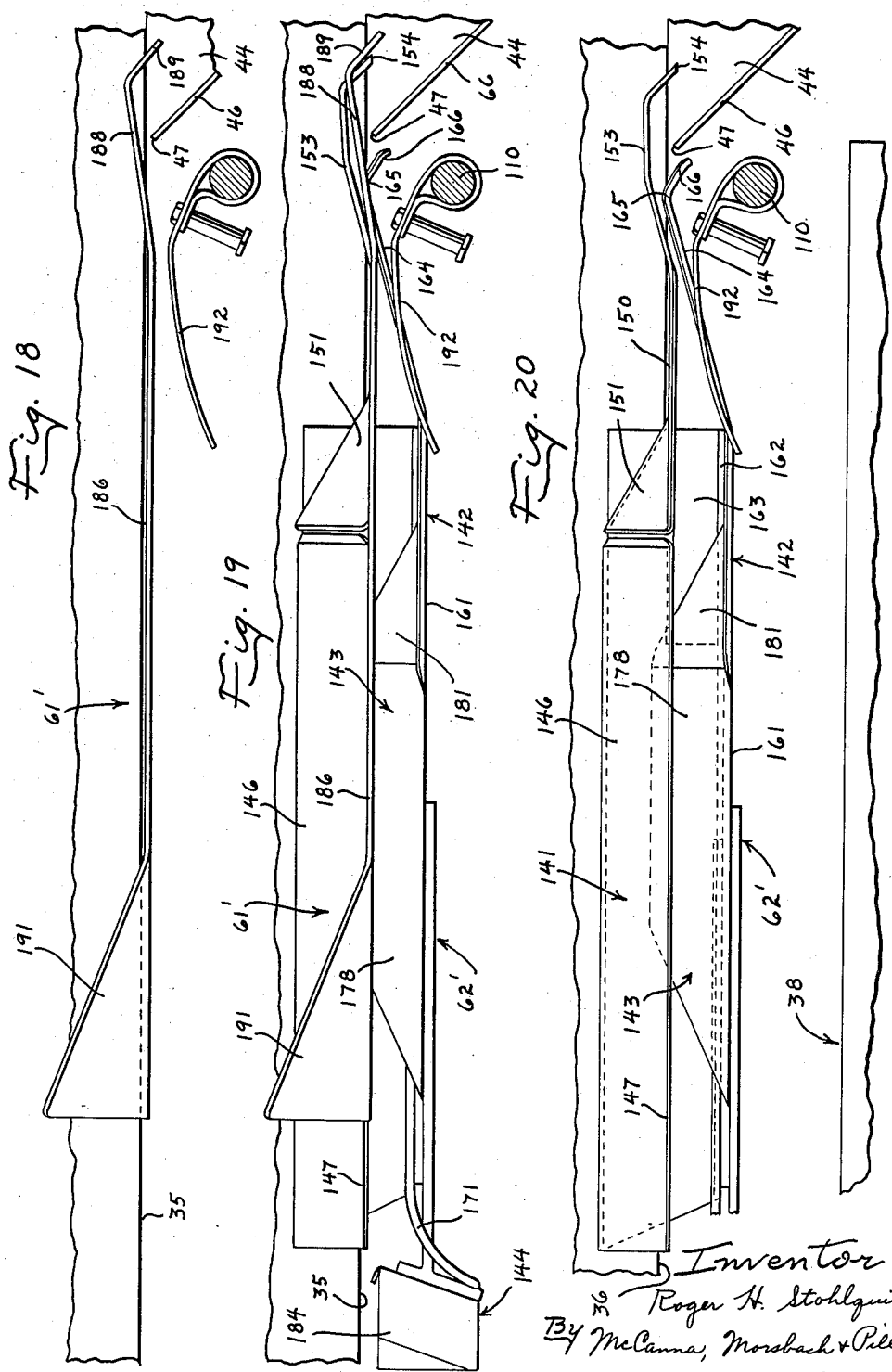

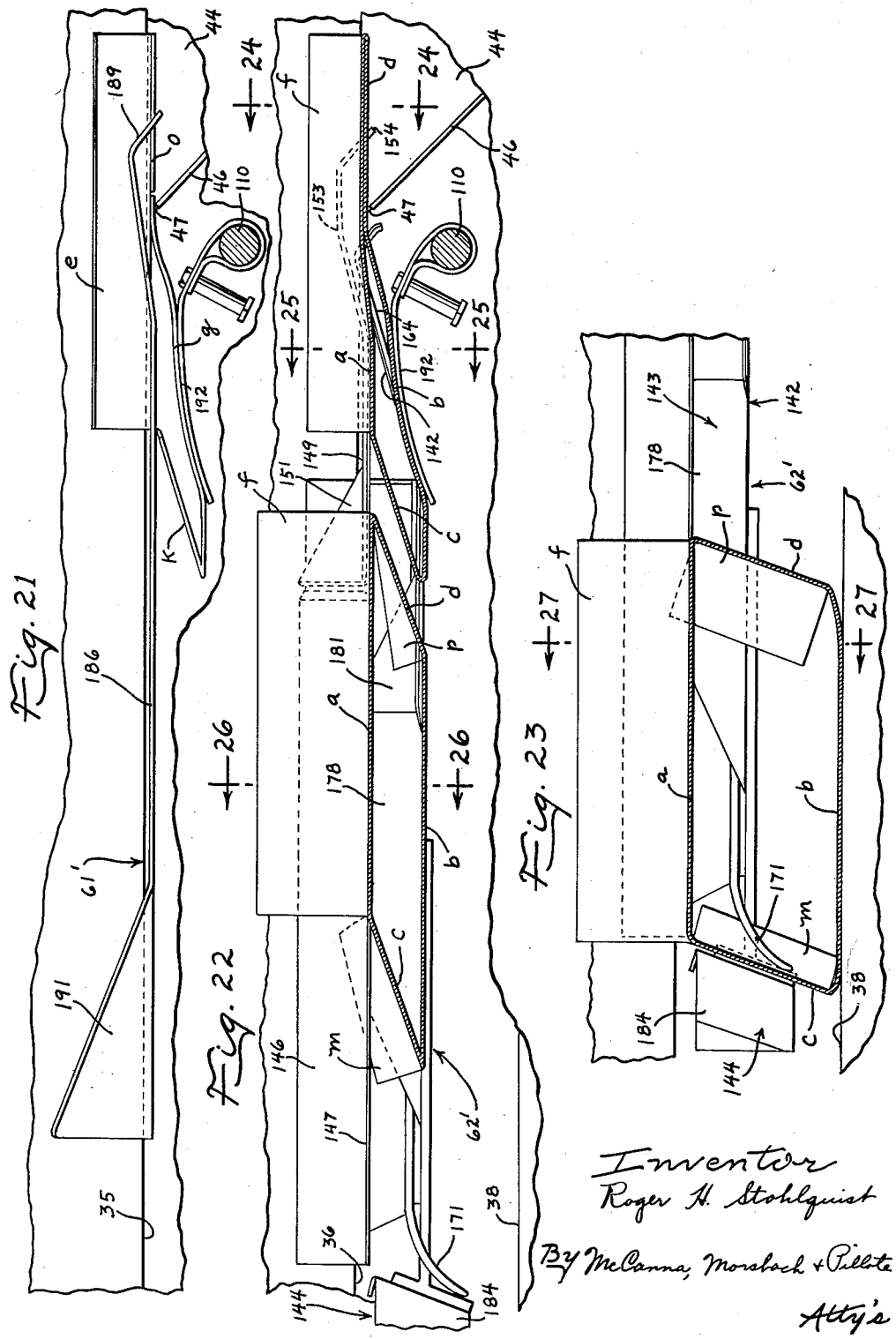

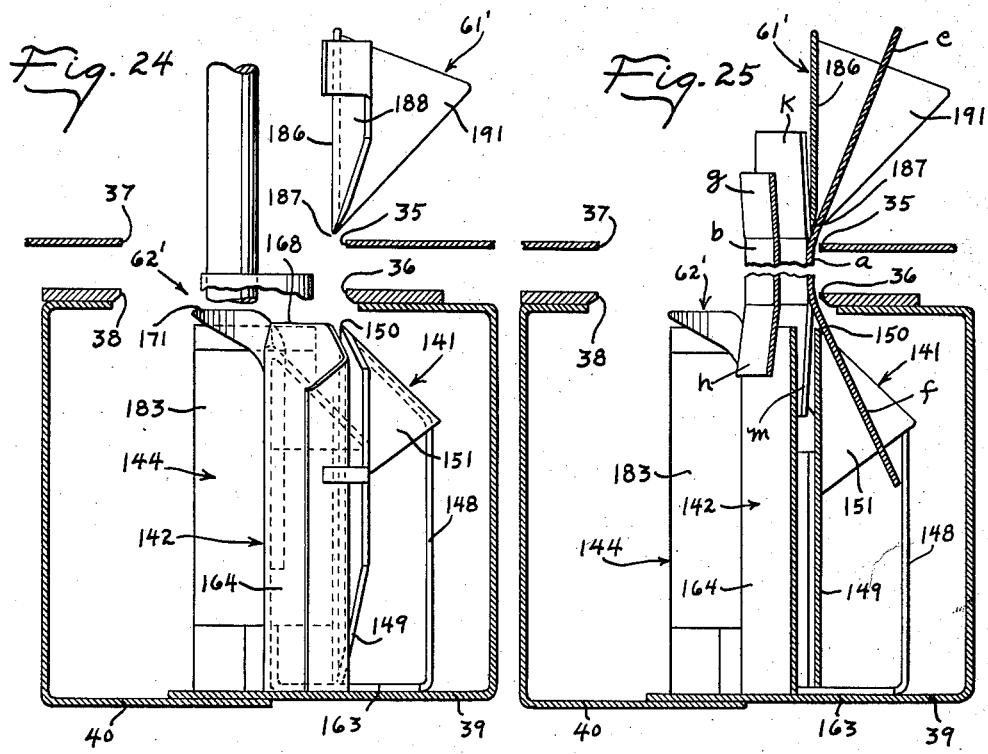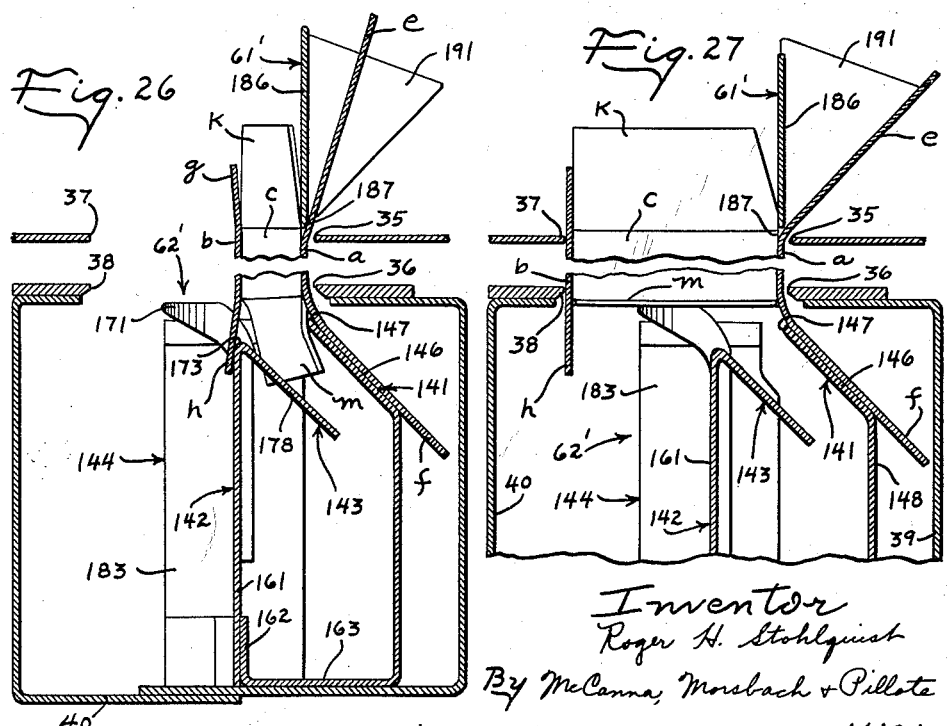

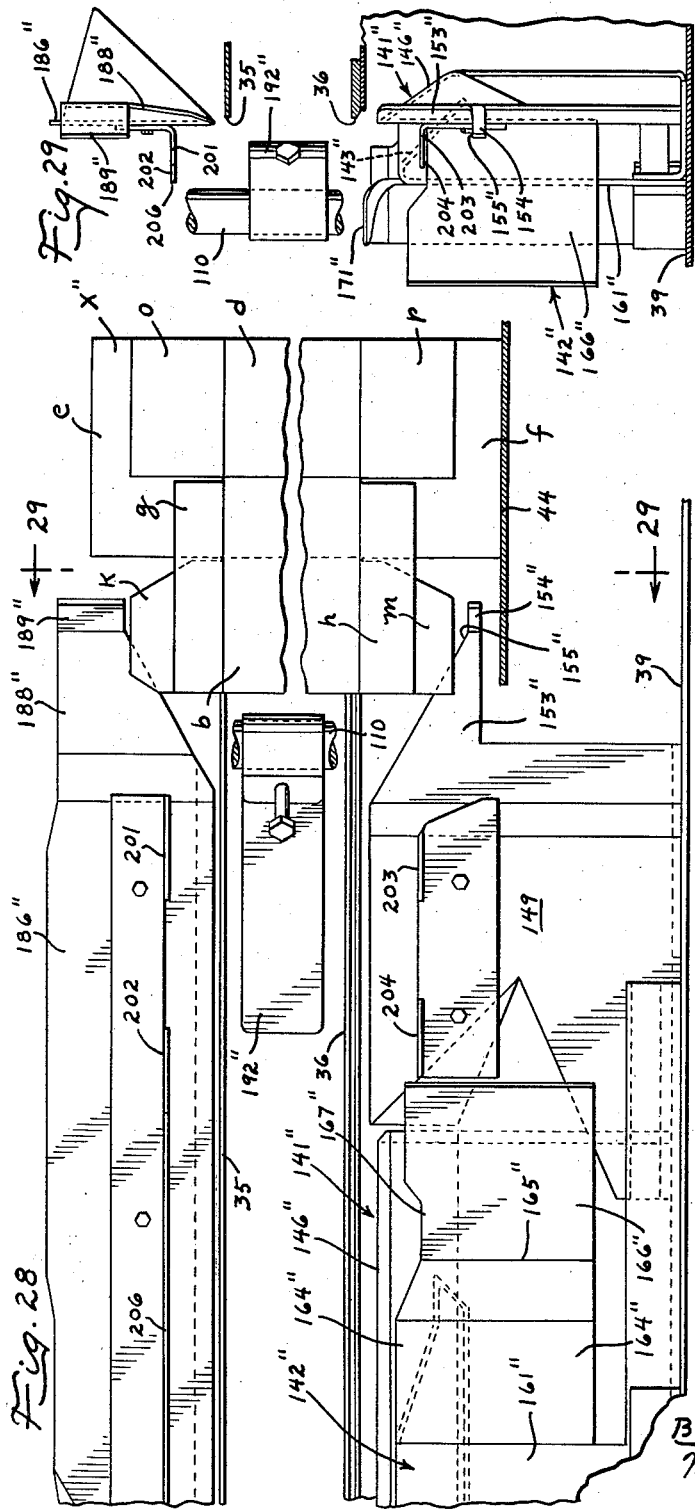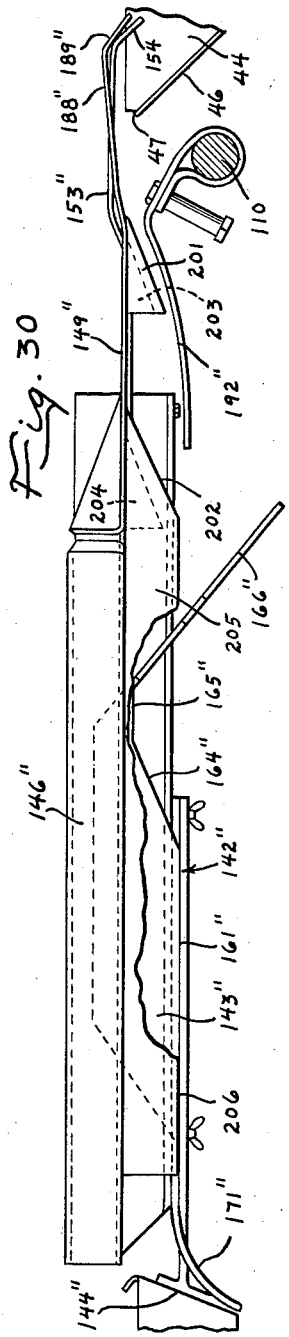

This invention relates to a method and apparatus for erecting flattened cartons of the type having four body walls and flaps on the end of the walls adapted to form closures for the ends of the carton when the carton is erected.

In order to enable compact shipping and storage of cartons, it is common to preform carton blanks in a flattened condition and to erect and fold the flattened cartons as the cartons are advanced through a packaging machine. One of the problems encountered with prior machines for erecting and folding flattened cartons arose in connection with the guiding and supporting of the cartons during the time the carton is being opened and while the lower flaps are being folded sufficient to allow the carton to be supported on its bottom. When the cartons are in a flattened condition, they can be supported on the lower ends of the carton flaps and, after the lower flaps are folded, the carton can be supported on its bottom. However, during opening of the carton and folding of the lower flaps, the carton cannot be supported either on the ends of the flaps or on the bottom of the carton, and difficulties have been encountered in properly supporting and guiding the carton during this phase of the carton erection.

It is an important object of the present invention to provide an improved method and apparatus for erecting and folding flattened cartons by which the cartons are positively supported and guided during the opening of the carton and until the lower flaps on the carton are folded sufficient to enable supporting of the carton on its bottom.

Another problem encountered with prior apparatus for erecting and folding cartons arises in connection with the infolding of the bottom flap that trails during movement of the carton through the machine. In general, it has heretofore been the practice to provide movable, mechanically operated flap folding apparatus for infolding the bottom trail flap after the carton has been opened and squared.

Another important object of this invention is to provide an improved method and apparatus for erecting flattened cartons wherein the bottom trail flap is folded inwardly of the carton while the carton is being opened and squared.

Yet another object of the present invention is to provide a method and apparatus for erecting flattened cartons during advancement of the cartons through a packaging machine wherein the lead flap on the upper end of the carton is also folded outwardly during erection of the carton so as to not interfere with subsequent filling of the carton.

A further object of this invention is to provide an apparatus for erecting and infolding the trailing flap on the lower end of the carton and which is of simple construction, reliable in operation, and which does not require movable mechanically operated parts to effect infolding of the trailing flap.

An additional object of this invention is to provide an improved method and apparatus for erecting and folding flattened cartons and which effects positive lateral separation of the side walls of the carton to open and erect the same.

Yet another object of this invention is to provide a carton erecting and folding apparatus which is adapted to handle cartons of different height, width and length.

These, together with other objects and advantages of this invention will be appreciated as the same becomes better understood by reference to the following detailed description, when taken in connection with the accompanying drawings wherein:

FIG. 1 is a fragmentary perspective view of a packaging machine having the carton erecting and folding apparatus applied thereto;

FIG. 2 is a perspective view of one form of carton erecting and folding apparatus and illustrating a carton as it is advanced therethrough;

FIG. 3 is a fragmentary perspective view of the packaging machine of FIG. 1 illustrating the carton after it leaves the erecting apparatus and showing how it is closed and sealed after filling;

FIG. 4 is a fragmentary longitudinal sectional view through the packaging machine illustrating the upper and lower carton erecting and folding shoe assemblies;

FIGS. 5, 6 and 7 are horizontal sectional views taken on the plane 5—5 of FIG. 4 illustrating the lower carton erecting shoe assembly with cartons in different moved positions;

FIG. 8 is a fragmentary vertical sectional view of the lower carton erecting shoe assembly taken on the plane 8—8 of FIG. 6 and illustrating the positions of the carton flaps as the carton is advanced through the shoe assembly;

FIG. 9 is a fragmentary plan view of the packaging machine illustrating the uppper carton erecting shoe assembly;

FIG. 10 is a fragmentary vertical sectional view taken on the plane 10—10 of FIG. 9 and illustrating the upper carton erecting shoe assembly and cartons in different moved positions as they are advanced through the assembly;

FIG. 11 is a fragmentary transverse sectional view through the packaging machine taken on the plane 11—11 of FIG. 4;

FIG. 12 is a fragmentary transverse sectional view through the packaging machine taken on the plane 12—12 of FIG. 4;

FIG. 13 is a fragmentary transverse sectional view through the packaging machine taken on the plane 13—13 of FIG. 4;

FIG. 14 is a view of a flattened carton;

FIG. 15 is a perspective view of a second form of carton erecting and folding apparatus;

FIG. 16 is a side elevational view of the carton erecting and folding apparatus of FIG. 15;

FIG. 17 is another side elevational view of the carton erecting and folding apparatus on a smaller scale than FIG. 15 and illustrating a carton just prior to entering the erecting and folding apparatus;

FIG. 18 is a top view of the upper shoe assembly;

FIG. 19 is a top view of the upper and lower shoe assemblies;

FIG. 20 is a top view of the lower shoe assembly;

FIG. 21 is a top view of the upper shoe assembly illustrating a carton as it is advanced through the upper shoe assembly;

FIG. 22 is a top view of the lower shoe assembly illustrating cartons in different moved positions as the cartons are advanced through the lower shoe assembly;

FIG. 23 is a fragmentary view of the lower shoe assembly illustrating a carton as it is squared;

FIG. 24 is a sectional view through the upper and lower shoe assemblies taken on the plane 24—24 of FIG. 2;

FIG. 25 is a transverse sectional view through the upper and lower shoe assemblies taken on the plane 25—25 of FIG. 22;

FIG. 26 is a transverse sectional view through the upper and lower shoe assemblies taken on the plane 26—26 of FIG. 22;

FIG. 27 is a transverse sectional view through the upper and lower shoe assemblies, taken on the plane 27—27 of FIG. 23;

FIG. 28 is a fragmentary side view of a third form of carton erecting and folding apparatus;

FIG. 29 is a sectional view taken on the plane 29—29 of FIG. 28; and

FIG. 30 is a plan view of the upper and lower shoe assemblies shown in FIG. 28, with parts broken away to illustrate details of construction.

The present invention is directed to the erection of preformed flattened cartons X of the type having four body walls and flaps on the ends of the body walls which can be infolded to close the ends of the carton. The method and apparatus of the present invention is generally adapted for use in erecting cartons of different length, width and height and one typical flattened carton is illustrated in FIG. 14. Although the relative length, width and height of the cartons illustrated in the several embodiments of the present invention differs from the specific proportions of the carton in FIG. 14, the cartons all have the same general wall and flap arrangement and like letters are used throughout to designate corresponding parts of the cartons. The cartons in general include spaced side walls $a$ and $b$ and lead and trail end walls designated $c$ and $d$ which are interconnected to the side walls along fold lines. Upper and lower side flaps $e$ and $f$ are articulated to the side wall $a$ and upper and lower side flaps $g$ and $h$ are articulated to the side wall $b$. Lead flaps $k$ and $m$ are connected to the lead wall $c$ and trailing flaps $o$ and $p$ are connected to the upper and lower ends of the trailing end wall $d$.

While the carton erecting and folding apparatus is generally adapted for use with a packaging machine or the like having a transfer mechanism for advancing the cartons past the erecting and folding apparatus, it is specifically designed for use with a machine of the type shown in my copending application for "Carton Erecting and Closing Machine," Serial No. 204,322, filed June 22, 1962, and which machine is adjustable to accommodate cartons of different height and width and which will automatically accommodate cartons of different length. Reference is hereby made to the aforementioned application for a more complete description of the machine. In general, the packaging machine includes frame sections 33 and 34 which are supported for lateral adjustment toward and away from each other. As best shown in FIGS. 11-13, the frame section 33 has upper and lower lateral carton guides 35 and 36 and the frame section 34 has upper and lower lateral carton guides 37 and 38 which are spaced apart a distance corresponding to the width of an open carton and arranged to engage the side walls of the carton to laterally guide the carton therebetween. As more fully disclosed in the aforementioned application, the lower lateral carton guides 36 and 38 are mounted on channel shaped members 39 and 40 which are supported, as by racks 41 and 42 for vertical adjustment toward and away from the upper guides 35 and 37 to accommodate cartons of different height. In addition, the side frame sections 33 and 34 are laterally adjustable toward and away from each other to vary the spacing between the lateral carton guide 35, 36 and 37, 38 to accommodate cartons of different width. The flattened cartons are stacked on a loading platform 44 adjacent one end of the frame 33 and the flattened cartons are advanced as by a feed plate 45 toward the frame 33. The flattened cartons in the stack are so arranged that the side wall $a$ and the lead end wall $c$ of the cartons engage the upper and lower lateral carton guides 35 and 36, with the end wall $c$ located at the lead end of the carton, as the carton is removed from the stack and advanced through the packaging machine. A guide plate 46 is preferably disposed at an angle of substantially less than 90 degrees to the plane of the upper and lower lateral carton guides 35 and 36 so that the lead and trail edges of the cartons are disposed in stepped overlapping relation, as best shown in FIG. 6. The edge 47 of the guide plate 46 is spaced from the lateral carton guides 35 and 36 a distance substantially equal to the thickness of the flattened carton so as to permit only a single carton to move off the stack at one time.

A transfer mechanism is provided for removing the end carton from the stack and for advancing the carton through the packaging machine between the guides 35-38. As best shown in FIGS. 11-13, the transfer mechanism includes spaced slide plates 48 and 49 mounted by upper and lower guides 50 and 51 on the frame sections 33 and 34 for reciprocation longitudinally of the lateral carton guides. Carton stripper elements 53 are mounted on the slide 48 adjacent one end, and which stripper elements have a stepped face defining a shoulder 54 intermediate their ends adapted to engage the trailing edge of the end carton in the stack to move the same off the stack as the slide is extended. As best shown in FIGS. 5 and 6, the step in the face of the stripper elements provides an offset substantially equal to the thickness of a flattened carton, and the stripper elements move a flattened carton off the end of the stack and advance the same a preselected distance along the carton guides 35-38. A plurality of carton engaging fingers, herein shown three in number and designated 55, 56 and 57 are mounted on each of the slides 48 and 49 at spaced points therealong, and with the fingers on the slides 48 and 49 and arranged in opposed pairs so as to simultaneously engage and advance the carton. The carton engaging fingers are yieldably urged into the path of movement of the cartons as by springs 58 (see FIGS. 1 and 2) and are shaped so as to be cammed outwardly by the cartons during retraction of the slide so as to pass around the next succeeding carton. The slides are extended and retracted by mechanism (not shown) a distance somewhat greater than the spacing between the adjacent carton engaging fingers on the slides so that the cartons are intermittently advanced through the machine as the slides are extended and retracted.

CARTON ERECTING AND FOLDING SHOE ASSEMBLIES

The carton erecting and folding apparatus includes upper and lower erecting and folding shoe assemblies 61 and 62 located intermediate the ends of the packaging machine to engage the carton flaps and carton as it is advanced between the guides 35-38. In general, the carton erecting and folding shoe assemblies are arranged to guidably support the side walls $a$ and $b$ in such a manner as to positively laterally separate the side walls $a$ and $b$ as the carton is advanced along the shoe assemblies and to retard advancement of the side wall $b$ relative to the side wall $a$ so that the end walls swing relative to the side walls until the carton is substantially squared. The erecting and folding shoes also deflect and guide the lower trail flap $p$ on the carton laterally of the end wall $d$, as the carton is advanced along the shoes and opened, so as to fold the trailing end flap to a position extending transverse to its end wall $d$ before the carton is fully opened and squared, the lead flap $m$ on the lower end of the carton is folded rearwardly and inwardly of the carton so that the lead and trail flaps partially close the bottom of the carton. The partially closed carton is then advanced onto the carton support platform 64 which is disposed between the lateral carton guides 36 and 38, to be supported thereby. The upper carton erecting and folding shoe assembly 61 is advantageously arranged to outfold the lead and trail flaps $k$ and $o$ on the upper end of the carton and to outfold the side flaps $e$ and $g$ so as to facilitate filling of the carton. After filling, the cartons are advanced along the platform 64 by the aforementioned transfer mechanism. As the cartons are advanced, the side flap *h* on the lower end of the carton is folded inwardly and upwardly, as by flap guide shoes 65 and 66 in the side and top of the platform 64 (see FIGS. 1 and 3). The trailing flap *o* on the upper end of the carton is folded inwardly as by a flap folding apparatus 68 (see FIG. 13) and the side and lead flaps *g* and *k* on the upper end of the carton are folded inwardly as by a guide shoe 69 (see FIG. 1). The cartons are then moved laterally off the support platform 64 by a cross transfer mechanism 72 (see FIG. 3) and the top and bottom side flaps are folded downwardly to close the carton, as the carton is moved between the belt conveyors 74 and 75 of a carton compressor unit. As disclosed in the aforementioned application, adhesive may be applied to certain of the carton flaps such as *e* and *f* before closing the same in order to effect sealing of the cartons, or the flaps may be coated with a heat or pressure sensitive adhesive which seals as the carton presses through the compressor unit.

The lower shoe assembly 62 includes a first flap guide shoe 81 which is arranged to support and guide the side wall *a* for movement along the lateral guide 36 as the carton moves through the lower shoe assembly, and a second flap guide shoe 82 which diverges in the direction of movement of the cartons relative to the flap guide shoe 81 and which is arranged to support and guide the side wall *b* of the carton in such a manner as to shift the side wall *b* laterally away from the side wall *a* and to retard advancement of the side wall *b* so that the end walls *c* and *d* swing rearwardly relative to the side wall *a* as the carton is advanced. The lower shoe assembly also includes a third flap guide shoe designated generally by the numeral 83 which is arranged to engage and guide the trailing flap *p* on the lower end of the carton as the carton moves through the lower shoe assembly to a position transverse to the end wall *d* while the carton is being opened and squared so that the lower trail flap *p* extends inwardly of the carton when the latter is substantially squared as shown in FIG. 7. A plow 84 is positioned crosswise of the ends of the flap folding shoes 81 and 82 to engage the lower lead flap *m* and fold the same inwardly as the carton is moved off the lower shoe assembly and onto the platform 64. As the carton moves off the platform, the lower lead and trail flaps *m* and *p* are folded inwardly and the platform 64 supports the bottom of the carton with the lower side flaps *h* and *f* extending downwardly alongside the platform, as is clearly shown in FIG. 3.

The first flap guide shoe 81 has its upper edge 85 disposed substantially in the vertical plane defined by the upper and lower lateral carton guides 35 and 36 so that the lower side flap *f* and the lead and trail flaps *m* and *p* can straddle opposite sides of the edge 85. Thus, the edge 85 of the shoe 81 engages the lower end of the carton, at the juncture of the lead and trail walls *b* and *d* with the side walls *a*, to vertically support and laterally guide the side wall along the guides 35 and 36. For reasons pointed out hereinafter, the shoe 81 is preferably formed of sheet metal and is inclined in a crosswise direction downwardly and outwardly below the lower lateral guide 36 to deflect the lower side flap *f* outwardly at an angle to the plane of the sidewall *a*, as the carton is moved therealong. The flap guide shoe 81 may be mounted in any desired manner, and, as best shown in FIGS. 11–13, has an upright mounting portion 86 at its lower end. This mounting portion 86 is conveniently attached to an upright panel 87 and is supported on the vertically adjustably channel 39 that carries the lower lateral carton guide 36, for adjustment therewith to accomodate cartons of different height. The shoe 81 also has a nose portion 89 which is inclined in a directon longitudinally of the shoe to project into the path of movement of the lower side flap *f* as the carton is moved off the stack and guide the lower side flap into overlying relation with the rear side of the shoe 81. As best shown in FIGS. 4, 8 and 11, the upper edge of the nose portion 89 is cut away to a level below the lower edges of the lower lead and trail flaps *m* and *p* so that the lower lead and trail flaps are not guided to the rear side of the shoe 81, but instead pass to the front side of the shoe as the carton is advanced.

The second flap guide shoe 82 is also conveniently formed of sheet metal and is mounted at its lower end on a flanged based plate 91, conveniently formed integrally with the upright panel 87, and which base plate is supported on the vertically adjustable channel 39. For reasons set forth hereinafter, the shoe 82 includes an inlet portion 93 that diverges as viewed in plan relative to the plane of the lateral carton guides 35 and 36; on intermediate portion 94 which extends generally parallel to the plane of the lateral carton guides and is spaced intermediate the lower lateral carton guides 36 and 38, and an outlet end portion 95 that diverges relatively rapidly, as viewed in plan from the end of the intermediate portion 94 and toward the other lateral carton guide 38. The upper edge 97 of the flap guide shoe 82 is disposed adjacent the level of the lower ends of the side walls of the cartons, and the inlet end is cut away as indicated at 97*a* to a level below the lower edge of the side flap *h* and above the lower edge of the end flaps *m* and *p* so as to guide the lead and trail flaps on the lower end of the carton to the inner or rear side of the shoe 82. A nose portion 98 is provided at the inlet end of the shoe 82 and extends outwardly into the path of movement of the lower lead and trail flaps *m* and *p* to guide the same to the rear side of the shoe 82. As best shown in FIGS. 5–7, one end of the inlet portion 93 extends closely adjacent to the plane of the guide edge 85 on the shoe 81 so as to underlie the lower side flap *h* and guide the same to the outer or front side of the shoe 82. Thus, the lower side flap *h* and the lower end flaps *m* and *p* straddle relatively opposite sides of the guide shoe 82 and the latter engages the lower end of the cartons adjacent the juncture of the side wall *b* with the lead wall *c* and also adjacent the juncture of the side wall *b* with the trailing wall *d* to vertically support the carton and to also laterally separate the side walls as the carton is advanced along the shoes 81 and 82. As the carton moves along the shoes 81 and 82, the diverging inlet portion 93 and the intermediate portion 94 produce an initial partial opening of the carton as shown in FIG. 6. Thereafter, as the lead corner of the carton rides on the curved outlet portion 95 of the shoe 82, there is a relatively rapid opening movement of the carton and the advance of the side wall *b* is retarded relative to the side wall *a* so that the lead and trail end walls *c* and *d* swing rearwardly relative to the side wall *a* to square the carton.

As will be noted from FIG. 7, the intermediate portion 94 of the shoe 82 extends from the end of the curved outlet portion 95 a distance somewhat greater than the length of the side walls *a* and *b* of the carton. When the carton is in the partially opened position shown in FIG. 6, the lower trailing flap *p* is disposed at the rear or inner side of the shoe 82. As the carton is advanced and squared from the position shown in FIG. 6 to the position shown in FIG. 7, the end wall *d* swings crosswise of the upper end of the shoe 82 and the trailing flap *p* is guided to a position extending transverse to the trailing wall *d*. As best shown in FIGS. 4 and 8, the upper edge of the shoe 82 is recessed at 97*b* to a level slightly below the lower ends of the side wall *b* and trailing wall *d*, to facilitate movement of the trailing flap *p* crosswise of the shoe. Since the intermediate portion 94 of the shoe is located intermediate the lower lateral carton guides 36 and 38, the intermediate portion functions to maintain the trailing flap in a position extending transverse to the trailing wall as the carton is squared and advanced past the erecting shoes. The upper edge of the shoe 82 gradually rises as indicated at 97*c* between the recessed portion 97*b* and the upper edge of the curved outlet portion 95 to raise the trailing flap above the plow 84.

In order to facilitate movement of the trailing flap *p* crosswise of the plow 82 during squaring of the carton, it has been found advantageous to deflect the trailing flap laterally of the plane of the trailing wall before the carton is opened substantially and prior to swinging movement of the trailing end wall *b* crosswise of the plow 82. For this purpose, the third flap folding plow, 83 is provided intermediate the plows 81 and 82 and positioned so as to engage the trailing flap *p* on the carton and deflect it laterally, as the carton is advanced along the plows to the position shown in FIG. 6. In the embodiment shown in FIGS. 1–13, the flap folding plow 83 is supported on the panel 87 and underlies the first flap folding plow 81. The plow 83 is conveniently in the form of a sheet metal panel which is inclined in a direction crosswise of the plow as best shown in FIGS. 11–13 and which is spaced below the downwardly and rearwardly inclined plow 81 to define a channel therebetween for receiving the trailing flap *p*. A nose portion 102 is inclined, as viewed in plan, to extend into engagement with the lead flap *m* on the lower end of the carton, when the cartons are in the stack, as shown in FIGS. 4, 5, 6 and 8. The upper edge 103 of the nose portion 102 is disposed at a level above the lower end of the lead flap *m* and below the lower end of the side flap *h* so that the lead flap *m* is guided to the front or inner side of the shoe 83 as the carton is advanced. However, the nose portion 102 engages the trailing flap *p* as the trailing flap moves thereby and the trailing flap is deflected to the rear side of the shoe 83 and to the front side of the shoe 81, as best shown in FIG. 2. As best shown in 5 and 6, the nose portion 102 is also inclined in a direction crosswise of the path of movement to aid in guiding the trailing flap on the carton to the rear side of the downwardly and rearwardly inclined shoe 83. Thus, when the carton reaches the position shown in FIG. 6, the trailing flap is already deflected at an angle to the trailing wall *d*, and the trailing flap is smoothly guided upwardly and inwardly of the carton as the carton is squared, as shown in FIG. 7.

The plow 84 at the outlet end of the lower shoe assembly may be supported in any desired manner and is herein shown mounted by a bracket 105 on the shoe assembly for removal therewith. The plow 84 includes an upright panel 106 which extends crosswise between the lateral carton guides 35, 36 and 37, 38 and is preferably inclined at a shallow angle to the perpendicular, as is clearly shown in FIGS. 4, 6 and 8. An upper panel 107 extends from the upright panel 106 and is inclined upwardly to aid in guiding the lead flap *m* inwardly of the carton as it is advanced. Thus, the plow 84 guides the lead flap to its position extending inwardly of the carton and into overlying relation with the carton support platform 64.

The upper plow assembly 61 is arranged to guide the side wall *a* of the carton for movement along the lateral carton guides 35 and 36 and to prevent lifting of the carton as it moves through the lower plow assembly. The upper carton flaps cannot be infolded and closed at this stage, since it is first necessary to fill the cartons. However, in the form shown in FIGS. 1–13, the upper plow assembly is also advantageously arranged to outfold the flaps on the upper end of the carton to facilitate the subsequent filling operation. The upper shoe assembly 61 is conveniently mounted on a panel 111 of a mounting bracket 112 attached to the frame section 33, and includes a first flap guide shoe 113 and a second flap guide shoe 114. The shoe 113 is conveniently in the form of a panel inclined upwardly and outwardly and with its lower edge 115 disposed adjacent and parallel to the plane of the upper and lower lateral carton guides 35 and 36, as is clearly shown in FIGS. 11–13. The plow 113 has a nose portion 116 which is inclined as viewed in plan relative to the plane of the lateral carton guide and has an end 117 that extends into the path of movement of the upper side flap *e* on the carton, as best shown in FIG. 9. The end 117 of the nose 116 which projects into the path of movement of the side flap is cut away at its lower edge, as indicated at 118 (FIG. 10) so as to be disposed above the level of the end flaps *k* and *o* and below the upper edge of the side flap *e*. Thus, as the carton is moved off the stack, the end flaps *k* and *o* are guided to the front or inner side of the shoe 113 and the side flap *e* is deflected to the rear or outer side of the shoe, as shown in FIG. 2. The upper side flap *e* and the upper lead and trail flaps *k* and *o* thus straddle relatively opposite sides of the edge 115 on the shoe 113 so that the upper edge of the side wall *a* of the carton is laterally and vertically guided along a path paralleling the guides 35 and 36.

The second upper flap folding shoe 114 is also conveniently in the form of a sheet metal panel which is attached to the panel 114 and spaced above the shoe 113 to define a channel therebetween for receiving the lead and trail flaps *k* and *o*. The shoe 114 has a nose portion 121 inclined laterally of the plane of the shoe, the lower edge 122 of which nose portion is disposed at a level above the upper end of the side flap *g* and below the upper ends of the lead and trail flaps *k* and *o* to guide the lead and trail flaps to the rear side of the shoe 114 and to also guide the side flap *g* to the front of the shoe 114 (see FIG. 10). The shoe 114 also preferably includes a generally horizontally extending blade portion 124 having a side edge 125 disposed substantially vertically above the intermediate portion 94 of the lower shoe 82. A curved end portion 126 is provided at the outlet end of the shoe 114, and corresponds generally in shape, as viewed in plan, to the portion 95 on the lower shoe.

Thus, as the cartons are moved off the stack past the upper shoe assembly, the side flap *e* is deflected to the rear of the shoe 113; the lead and trail flaps are deflected to a position intermediate the shoes 113 and 114 and the other side flap *g* is guided to a position at the front of the shoe 114. With the above arrangement, it will be noted that both the upper lead and trail flaps *k* and *o* are deflected laterally of the plane of the respective lead and trail walls *c* and *d* before the carton is opened substantially, and the lead and trail flaps are maintained in this position as the carton is opened and squared so that the lead and trail flaps both project forwardly at the time the carton is initially squared. An upper flap folding plow 128 is provided adjacent the outlet end of the upper shoe assembly and, as shown, the plow 128 includes a generally horizontally disposed plate 129 disposed adjacent the level of the upper ends of the cartons and having an edge 131 extending crosswise between the upper lateral carton guides 35 and 37 and preferably at a shallow angle to the perpendicular, as is clearly shown in FIG. 9. A flap deflector finger 132 is provided on the shoe 114 and, as best shown in FIGS. 4 and 10, extends downwardly to a level below the shoe 129. The finger 132 extends outwardly to one side of the plane of the lateral carton guides 35 and 36 and is arranged to engage the upper lead flap *a* while the carton is being squared, to deflect the same downwardly below the shoe 129 so that the lead flap remains in its outwardly folded position as it moves below the shoe 129. However, by the time the upper trailing flap *o* moves past the shoe 129, the carton has been completely squared. Accordingly, the trailing flap does not engage the deflector finger 132 but instead swings upwardly and engages the edge 131 of the shoe 129. This causes the trailing flap *o* to be folded outwardly, as shown in FIG. 10, as the container is advanced. The shoe 129 is conveniently supported on an angulated bracket 133 attached to the flap folding shoe 114 and the shoe 129 is adapted to overlie the upper trailing flap when the carton is at the filling station shown in FIG. 9 to hold the trailing flap outwardly. The rear side flap *e* is guided by the shoe 113 to the underside of a hold down panel 135 at the filling station and the other side flap *g* is also preferably guided to the underside of a hold down plate 136 at the front side of the filling station.

Embodiment of FIGS. 15–27

A modified form of upper and lower carton erecting and folding shoe assemblies designated 61' and 62' is illustrated in FIGS. 15–27. The shoe assemblies are adapted for use on the same packaging machine illustrated in the embodiments of FIGS. 1–13 and like numerals are used to designate corresponding parts of the machine. As in the preceding embodiments, the lower shoe assembly 62 includes a first flap folding shoe 141 which is arranged to support and guide the rear wall $a$ of the carton X'; a second flap folding shoe 142 which is arranged to guide and support the other side wall $b$ of the carton and to separate the side walls as the carton is advanced to open and erect the carton, and a trailing flap folding shoe designated 143 which is arranged to deflect the lower trailing flap $p$ on the carton and fold the same inwardly as the carton is advanced and opened. A lead flap folding plow 144 is provided at the outlet end of the plows 141 and 142 to infold the lower lead flap $m$. The flap folding plow 141 has an outlet end portion 146 extending alongside the region where the carton is opened and squared, and which outlet portion is conveniently formed of sheet stock with its upper edge 147 paralleling the lateral carton guides 35 and 36 and disposed substantially vertically therebelow, as is clearly shown in FIGS. 26 and 27. The portion 146 is inclined downwardly and rearwardly from its upper edge to deflect the lower side flap $f$ at an angle to the side wall $a$, as the carton is advanced along the shoe. The portion 146 may be supported in any desired manner and, as shown, is mounted by a generally upright panel portion 148 on the vertically adjustable channel member 39 of the packaging machine. The shoe 141 also includes an inlet end portion 149 in the form of a generally upright blade having its upper edge 150 disposed at substantially the same level as the upper edge 147 of the outlet end portion 146. The blade is disposed substantially in the plane of the lateral carton guides 35 and 36 and has a portion 151 bent rearwardly to define an inclined guide panel for guiding the lower side flap $f$ into overlying relation with the outlet end portion 146. The inlet end 153 of the blade is bent rearwardly, as viewed in plan, relative to the plane of the lateral carton guides 35 and 36 and the tip portion 154 extends forwardly of this plane and into the path of movement of the lower side flap $f$. As best shown in FIGS. 16 and 17, the upper edge 155 of the tip portion 154 is disposed at a level below the lower edges of the lead and trail flaps $m$ and $p$ and above the level of the lower side flap $f$ so that the lead and trail flaps pass in front of the blade 149 while the lower side flap $f$ is guided to the rear side of this blade.

The second flap guide shoe 142 diverges in the direction of movement of the carton relative to the shoe 141, to move the side wall $b$ laterally away from the side wall $a$ and thereby open the carton. As in the preceding embodiment, the second flap folding shoe 142 includes an intermediate portion 161 conveniently in the form of an upright panel which extends generally parallel to the plane of the lateral carton-guides 35 and 36 and is offset forwardly therefrom a distance less than the width of an opened carton. The panel 161 is conveniently mounted on a flange 162 which is integrally connected to the upright mounting portion 148 for the shoe 141 by a base portion 163 (see FIG. 26) to maintain the shoes 141 and 142 in proper spaced relation. The shoe 142 also includes an inlet end portion 164 which is inclined as viewed in plan (see FIGS. 19 and 20) and terminates at its inlet end at a point adjacent the plane of the lateral carton guides 35 and 36. The end 165 of the shoe 142 is spaced from the end of the carton in the stack and a nose portion 166 is provided at the end of the plow, and which nose portion converges in the direction of movement of the cartons toward the plane of the lateral carton guides 35 and 36. As shown in FIGS. 16 and 17, the upper edge 167 of the nose portion 166 is disposed at a level below the lower edge of the side flap $h$ and above the lower edges of the lead and trail flaps $m$ and $p$ so as to guide the lead and trail flaps to the rear side of the shoe 142 while guiding the side flap $h$ to the front side of the shoe. Thus, the side flap $h$ and the lead and trail flaps $m$ and $p$ straddle relatively opposite sides of the shoe 142 and the upper edge 168 of the shoe is disposed adjacent the level of the lower ends of the side wall $b$ so as to vertically and laterally guide the same during movement of the carton through the lower shoe assembly. The shoe 142 also includes an outlet portion 171 which is curved as viewed in plan so as to diverge relatively rapidly, in the direction of movement of the cartons, away from the plane of the lateral carton guides 35 and 36. The portion 171 may conveniently be formed separate from the shoe 142 and attached thereto as by fasteners 172, or it may be formed integrally therewith, if desired. The upper edge of the outlet portion 171 effectively forms a continuation of the upper edge 168 of the shoe 142 and the lead corner of the carton is adapted to ride on the curved portion 171 to open and square the carton as shown in FIG. 23. The diverging inlet portion 164 of the shoe 142 produces a partial opening of the carton, as the carton is advanced along the inlet portion 164 and the intermediate portion 161 of the shoe 142 to the position of the carton shown at the left in FIG. 22. At that time, both the lower lead and trail flaps $m$ and $p$ are disposed between the shoes 141 and 142. However, as the lead corner of the carton rides on the curved outlet portion 171, the side wall $b$ is rapidly moved away from the side wall $a$ and the advance of the side wall $b$ is retarded so that the end walls $c$ and $d$ swing rearwardly relative to the side wall $a$. The trailing end wall $d$ then swings crosswise of the upper edge of the intermediate portion 161 and is guided thereby to a position extending inwardly of the carton and transverse to the trailing wall $d$. The upper edge 173 of the intermediate portion 161 is preferably offset below the level of the lower ends of the carton side wall $b$, as shown in FIGS. 16 and 17, to facilitate movement of the trailing end wall crosswise of the shoe 142, during squaring of the carton.

The third flap folding shoe 143 is provided for guiding the trailing flap $p$ laterally of the end wall $d$ during advancement of the carton through the shoe assembly and while the carton is being squared. In this embodiment, the shoe 143 is conveniently formed integrally with the upper edge of the intermediate portion 161 of the shoe 142. The shoe 143 includes a panel 178 which is inclined downwardly and rearwardly from the upper side of the shoe 142 to a position underlying the shoe 146. In this embodiment, however, the shoe 143 only extends along the intermediate portion of the shoe 142 and has a nose portion 181 at its inlet end which is inclined downwardly and rearwardly as viewed in cross section and downwardly and forwardly as viewed from the side, so as to guide the lead and trail flaps $m$ and $p$ to a position inclined to the planes of the respective lead and trail end walls $c$ and $d$, after the carton has been initially opened, and before the carton is fully squared. The plow 144 extends crosswise of the outlet ends of the shoes 141 and 142 and includes an upright panel 183 inclined in a direction crosswise of the machine, and an upper panel 184 which extends upwardly in the direction of movement of the cartons to guide the lower lead flap $m$ inwardly of the carton, as the carton is advanced. A finger 192 is advantageously mounted on the post 110 to engage the walls of the carton at the front side thereof, as the carton moves off the stack, and into the plow assembly, to control opening of the carton.

In the embodiment of FIGS. 15–27, the upper shoe assembly 61' is only arranged to laterally and vertically guide the side wall $a$ of the carton, it being understood that the relatively more complex shoe assembly of FIGS. 1–13 could be provided if desired to effect outfolding of the upper flaps on the carton. The upper shoe assembly 61' includes an upright panel 186 disposed substantially in the plane of the lateral carton guides 35 and 36 with the lower edge 187 extending generally parallel thereto. A nose 188 is provided at the inlet end of the upper shoe 186, which nose is inclined rearwardly around the edge 47 of the stack guide plate 46, and terminates in a forwardly extending tip portion 189 that projects into the path of movement of the upper side flap e on the carton as it is advanced off the stack. The lower edge 190 of the tip portion 189 is disposed at a level above the upper edges of the end flaps k and o and below the upper edges of the side flap e to guide the side flap e to the rear side of the panel 186, while guiding the upper lead and trail flaps k and o to the front side. Thus, the upper side flap e and the upper lead and trail flaps k and o straddle opposite sides of the panel 186 so that the side wall a is laterally and vertically guided thereby to prevent lifting of the carton off the lower shoe assembly during movement of the cartons therealong. The trailing end of the panel 186 is preferably deflected rearwardly as shown at 191 to deflect the upper side flap e to the underside of the hold down shoe 135 on the packaging machine.

*Embodiment of FIGS. 28–30*

A further modification in the carton erecting and folding apparatus is illustrated in FIGS. 28–30. In the handling of certain tall, narrow cartons designated X", difficulties have been encountered due to the tendency of the carton to curve intermediate their upper and lower ends, if the end flaps are folded laterally before the carton is at least partially opened. Such a curve extended crosswise of the fold lines between the side and end flaps and rendered the carton very resistant to subsequent opening. The shoe assembly of FIGS. 28–30 is specifically adapted for handling tall cartons to overcome the aforementioned problem. The shoe assemblies in this embodiment are generally the same as those shown in the embodiment of FIGS. 15–27 and like numerals followed the subscript " are used to designate corresponding parts. The lower flap folding shoe 141" is substantially the same in construction and shape as the shoe 141 of the preceding embodiment and functions in a like manner. As in the preceding embodiment, it includes a downwardly and rearwardly inclined panel 146" at the outlet end portion and an inlet end portion in the form of a generally upright panel 149". The panel 149" has an inlet end 153" offset rearwardly as viewed in plan, relative to the plane of the lateral carton guides 35 and 36 and a tip portion 154" that extends forwardly into the path of movement of the lower side flap f. As shown in FIG. 28, the upper edge 155" of the tip portion is disposed below the lower edges of the lead and trail flaps m and p and above the lower edge of the side flap f. The second flap folding shoe designated 142" also includes a generally upright intermediate panel 161" having a third flap folding shoe 143" extending downwardly and inwardly from the upper edge thereof. A curved outlet portion 171" is provided at the outlet end of the shoe 142". In this embodiment, the inlet end portion 164" also diverges in the direction of movement of the cartons relative to the plane of the lateral carton guides 35 and 36 and has its inlet end 165" disposed closely adjacent that plane, but at a point spaced in the direction of movement of the carton from the inlet end portion 149" of the shoe 141". A nose portion 166" is provided at the inlet end of the shoe 142" and converges in the direction of the movement of the cartons toward the plane of the lateral carton guides to guide the lower lead and trail flaps m and p to the rear side of the shoe 142". As shown in FIG. 28, the upper edge 167" of the nose portion 166" is disposed so as to guide the lead and trail flaps m and p to the rear side of the shoe 142" and to permit the side flap h to pass in front of the shoe 142". A plow 144" similar to the plow 144 of the preceding embodiment is provided at the outlet end of the plows 141" and 142" to infold the lower lead flap m. The upper guide shoe assembly 186" is formed in the same manner as the shoe 186 of the preceding embodiment, and has a nose portion 188" and a tip 189" which functions to guide the upper side flap e to the rear of the shoe 186". As in the preceding embodiment, a finger 192" is mounted on the post 110 to engage the walls of the carton at the front side thereof as the carton moves off the stack and into the shoe assemblies, the finger guides the front side of the carton and controls the initial opening of the carton.

In accordance with the present invention, upper and lower pairs of generally wedge shaped members 201, 202 and 203, 204 are provided on the panel 186" and on the panel 149" respectively to produce an initial opening movement of the cartons, before the end flaps are folded. These members provide inclined ramps which are spaced apart a distance corresponding generally to the length of the side walls and which engage the lead and trail flaps on the upper and lower ends of the lead and trail end walls to produce an initial partial opening of the cartons, before the carton flaps are deflected by engagement with the shoes 142" and 143". As will be noted from FIG. 28, the wedge shaped members 201 and 202 are disposed at a level above the upper edge of the upper side flap g and below the upper edges of the upper lead and trail flaps k and o. Similarly, the wedge shaped members 203 and 204 are disposed at a level below the lower edge of the lower side flap h and above the lower edges of the lower lead and trail flaps m and p. When the carton is moved off the stack, the upper and lower lead flaps k and m first engage the wedge members 201 and 203. As the carton is advanced further, the upper and lower lead flaps k and m engage the wedge members 202 and 204 and, at about the same time, the upper and lower trail flaps o and p engage the wedge members 201 and 203. The wedge members push the end flaps and end walls away from the side wall and produce an initial partial opening of the carton. A generally horizontally disposed flap guide member 205 is preferably provided at the outlet end of the upper wedge member and has its edge 206 extending substantially parallel to the plane of the lateral carton guides and substantially vertically above the lower guide shoe 142" to maintain the upper end of the carton in its partially open position. Advantageously, the trailing end of the upper and lower wedge members 201 and 203 are positioned to engage the trailing edge of the carton when the carton stripper fingers are retracted, to prevent retograde movement of the cartons during retraction of the slide.

From the foregoing, it will be seen that the upper and lower carton erecting and folding shoe assemblies serve to positively support the carton and to guide the same as the flattened carton is opened and the lower lead and trail flaps folded sufficient to enable supporting the carton on its bottom. The lower trail flap is automatically folded inwardly, during advancement of the carton through the lower shoe assembly and opening and squaring of the carton, and the lower lead flap is folded inwardly after the carton is squared and advanced out of the shoe assembly. In addition, in the embodiment of FIGS. 1–13, the flaps on the upper end of the carton are folded outwardly to facilitate filling of the carton. The method and apparatus of the present invention thus eliminates the necessity of providing a mechanical or power operated mechanism for infolding the lower trailing flap as the carton is advanced through the packaging machine and, additionally, the shoes are so arranged as to positively guide and support the side walls and to separate the side walls as the cartons are advanced to provide a positive opening of the carton.

I claim:

1. The method of erecting and folding flattened cartons of the type having a first side wall and a first end wall at one side of the flattened carton and a second side wall and a second end wall at the other side of the flattened carton and flaps on at least one end of each of the walls comprising; moving the second side wall laterally away from the first side wall while swinging the first and second end walls relative to the first side wall to open and square the side and end walls of the carton, deflecting the flap on one of the end walls to extend laterally of the plane of that end wall before the carton is substantially squared; and thereafter maintaining that flap in a position extending laterally of the end wall.

2. The method of erecting and folding flattened cartons of the type having a first side wall and a first end wall at one side of the flattened carton and a second side wall and a second end wall at the other side of the flattened carton and flaps on at least one end of each of the walls comprising; moving the second side wall laterally away from the first side wall while swinging the first and second end walls relative to the first side wall to open and square the side and end walls of the carton, and deflecting the flap on one of the end walls at an angle to the plane of that end wall in response to swinging of the end walls relative to the first side wall during squaring of the carton to thereby fold the flap on that end wall transverse to the plane of the end wall as the carton is opened and squared.

3. The method of erecting flattened cartons of the type having a first side wall and a first end wall at one side of the flattened carton and a second side wall and a second end wall at the other side of the flattened carton and flaps on at least one end of each of said walls comprising; deflecting the flap on the second end wall at an angle to the plane of said second end wall in a direction toward the first side wall before the carton is fully opened, moving the second side wall laterally away from the first side wall while swinging the first and second end walls relative to the first side wall to open and square the carton, and guiding the flap on said second end wall to a position extending transverse to said second end wall as the second end wall swings relative to the first side wall during squaring of the carton.

4. The method of erecting flattened cartons of the type having a first end wall and a first side wall disposed at one side of the flattened carton and a second side wall and a second end wall at the other side of the flattened carton and flaps on the lower ends of said walls comprising; advancing the flattened carton along a path substantially paralleling said first side wall with said first end wall at the lead end of the carton and said second end wall at the trailing end of the carton, moving the second side wall laterally away from the first side wall while advancing the first side wall relative to the second side wall to swing the first and second end walls rearwardly relative to the first side wall to open and square the side and end walls of the carton, and deflecting the flap on the second end wall at an angle to the plane of that end wall and toward the first side wall as the second end wall is swung relative to the first end wall during squaring of the carton to thereby fold the flaps on that end wall inwardly of the carton as the carton is squared.

5. The method of erecting flattened cartons of the type having a first end wall and a first side wall disposed at one side of the flattened carton and a second side wall and a second end wall disposed at the other side of the flattened carton and flaps on the lower ends of each of said walls comprising; advancing the flattened carton along a path substantially paralleling said first side wall with said first end wall at the lead end of the carton and said second end wall at the trailing end of the carton, deflecting the flap on the second end wall toward said first wall at an angle to the plane of said second end wall before the carton is fully opened, thereafter shifting the second side wall laterally away from the first side wall while advancing the first side wall relative to the second side wall to swing the first and second end walls rearwardly relative to the first side wall until the carton is opened and squared, and guiding the flap on the second end wall to a position extending transverse to said second end wall as the second end wall is swung rearwardly relative to the first side wall whereby to project that flap in a direction inwardly of the carton.

6. The method of erecting flattened cartons of the type having a first end wall and a first side wall disposed at one side of the flattened carton and a second side wall and a second end wall disposed at the other side of the flattened carton and flaps on the lower ends of each of said walls comprising; advancing the flattened carton along a path substantially paralleling said first side wall with said first end wall at the lead end of the carton and said second end wall at the trailing end of the carton, deflecting the flap on the second end wall toward said first wall at an angle to the plane of said second end wall before the carton is fully opened, thereafter shifting the second side wall laterally away from the first side wall while advancing the first side wall relative to the second side wall to swing the first and second end walls rearwardly relative to the first side wall until the carton is opened and squared, guiding the flap on the second end wall to a position extending transverse to said second end wall as the second end wall is swung rearwardly relative to the first side wall whereby to project that flap in a direction inwardly of the carton, and folding the flap on the first end wall inwardly of the carton after the carton is opened and while it is being advanced along said path.

7. The method of erecting flattened cartons of the type having a first side wall and a first end wall at one side of the flattened carton and a second side wall and a second end wall at the other side of the flattened carton and upper and lower flaps on each of the walls comprising; advancing the carton along the path generally paralleling said first side wall with said first end wall at the lead end of the carton and the second end wall at the trailing end of the carton, deflecting the upper flap on the first end wall and the lower flap on the second end wall at an angle to the plane of the respective end wall and toward said one side of the carton before the carton has been fully opened, thereafter moving the second side wall laterally away from the first side wall while advancing the first side wall relative to the second side wall to swing the first and second end walls rearwardly relative to the first side wall until the carton is opened and squared, guiding the upper flaps on said first end wall and the lower flap on said second end wall to a position extending transverse to the respective end wall as the first and second end walls are swung rearwardly relative to the first side wall whereby to project those flaps forwardly in the direction of movement of the carton, and folding the flower flap on the first end wall inwardly after the carton has been opened.

8. An apparatus for erecting flattened cartons of the type having a first end wall and a first side wall at one side of the flattened carton and a second side wall and a second end wall at the other side of the flattened carton and flaps on at least one end of each of said walls comprising; a frame, lateral carton guide means on said frame, means on the frame for supporting a stack of flattened cartons, means for removing individual cartons from the stack and for advancing the same along a path with said first side wall engaging said lateral carton guide means, means for moving the second side wall laterally away from the first side wall and for swinging the end walls relative to the side walls to open and square the carton, and a flap guide means engageable with the flap on one of said end walls and operative in response to swinging of the end walls relative to the side walls for deflecting and guiding the flap on said one end wall to a position extending transverse to the plane of that end wall.

9. An apparatus for erecting flattened cartons of the type having a first end wall and a first side wall at one side of the flattened carton and a second side wall and a second end wall at the other side of the flattened carton and flaps on at least one end of each of said walls comprising; a frame, lateral carton guide means on said frame, means on the frame for supporting a stack of flattened cartons, means for removing individual cartons from the stack and for advancing the same along a path with said first side wall engaging said lateral carton guide means, means for moving the second side wall laterally away from the first side wall and for swinging the end walls relative to the side walls to open and square the carton, and a flap guide means engageable with the flap on the end wall that trails during advancing of the carton along said lateral carton guide means and operative in response to movement of the carton along said lateral carton guide means for deflecting the flap on the trailing end wall at an angle to that end wall and toward said first side wall before the carton is fully opened whereby the flap on the trailing end wall extends inwardly of the carton when the carton is opened and squared.

10. An apparatus for erecting flattened cartons of the type having a first end wall and a first side wall at one side of the flattened carton and a second side wall and a second end wall at the other side of the flattened carton and flaps on at least one end of each of said walls comprising; a frame, lateral carton guide means on said frame, means on the frame for supporting a stack of flattened cartons, means for removing individual cartons from the stack and for advancing the same along a path with said first side wall engaging said lateral carton guide means, means for moving the second side wall laterally away from the first side wall and for swinging the end walls relative to the side walls to open and square the carton, and a flap guide means engageable with the flap on one of the end walls operative in response to movement of the carton along said lateral carton guide means for deflecting the flap on one of said end walls at an angle to that end wall before the carton has been fully opened and operative in response to swinging of the end walls relative to the side walls for guiding that flap to a position extending transverse to the plane of the respective end wall during squaring of the carton.

11. An apparatus for erecting flattened cartons of the type having a first side wall and a first end wall at one side of the flattened carton and a second side wall and a second end wall at the other side of the flattened carton and flaps on at least one end of each of said walls comprising; a lateral carton guide means, means for advancing a carton along a path with said first side wall engaging said lateral carton guide means and with said first end wall at the lead end of the carton and said second end wall at the trailing end of the carton, means engageable with the carton as it moves along said lateral guide means for moving said second wall laterally away from said guide means and for retarding advancement of said second wall relative to said first wall to swing the first and second end walls rearwardly relative to said first end wall thereby to open and square the carton, and flap guide means having a portion spaced laterally from said lateral carton guide means a distance less than the width of an opened carton and positioned to engage the flap on said second end wall as it is swung relative to said first end wall to deflect that flap at an angle to the plane of said second end wall in response to swinging movement of the second end wall relative to the first side wall during squaring of the carton whereby to fold the flap on the second end wall to a position extending transverse to that end wall when the carton is squared.

12. An apparatus for erecting flattened cartons of the type having a first side wall and a first end wall at one side of the flattened carton and a second side wall and a second end wall at the other side of the flattened carton and flaps on at least one end of each of said walls comprising; a lateral carton guide means, means for advancing a carton along a path with said first side wall engaging said lateral carton guide means and with said first end wall at the lead end of the carton and said second end wall at the trailing end of the carton, means engageable with the carton as it moves along said lateral guide means for moving said second wall laterally away from said guide means and for retarding advancement of said second wall relative to said first wall to swing the first and second end walls rearwardly relative to said first end wall thereby to open and square the carton, and flap guide means engageable with the flap on said second end wall as the carton is advanced along said lateral carton guide means and while the end walls are swung relative to the first side wall during squaring of the carton for deflecting the flap on said second end wall to a position extending transverse to that end wall before the carton is substantially squared.

13. An apparatus for erecting flattended cartons of the type having a first end wall and a first side wall at one side of the flattened carton and a second side wall and a second end wall at the other side of the flattened carton and flaps on the lower ends of the walls comprising, a frame, means on the frame defining first and second lateral carton guides laterally spaced apart a distance corresponding to the width of an opened carton for guiding the cartons along a path, means on the frame for supporting a stack of flattened cartons, means for removing individual cartons from the stack and for advancing the same between said lateral carton guide with said first side wall alongside said first lateral carton guide and with said first end wall at the lead and said second end wall at the trail end of the flattened carton, first and second flap guide shoes extending along a portion of said lateral carton guides with the upper edges thereof disposed adjacent the path of movement of the lower ends of the carton walls, said first flap guide shoe having its upper edge disposed substantially vertically below said first lateral carton guide and said second flap guide shoe having at least a portion of its upper edge diverging in the direction of advance of the cartons relative to said first flap guide shoe, and means for guiding the flaps on the first and second end walls to a position between said first and second flap guide shoes and for guiding the flaps on the first and second side walls to the outer sides of said first and second flap guide shoes to straddle the same for support of the carton and to effect lateral separation of the side walls as the cartons are advanced therealong.

14. An apparatus for erecting flattened cartons of the type having a first end wall and a first side wall at one side of the flattened carton and a second side wall and a second end wall at the other side of the flattened carton and flaps on the lower ends of the walls comprising, a frame, means on the frame defining first and second lateral carton guides laterally spaced apart a distance corresponding to the width of an opened carton for guiding the cartons along a path, means on the frame for supporting a stack of flattened cartons, means for removing individual cartons from the stack and for advancing the same between said lateral carton guide with said first side wall alongside said first lateral carton guide and with said first end wall at the lead and said second end wall at the trail end of the flattened carton, first and second flap guide shoes extending along a portion of said lateral carton guides with the upper edges thereof disposed adjacent the path of movement of the lower ends of the carton walls, said first flap guide shoe having its upper edge disposed substantially vertically below said first lateral carton guide, said second flap guide shoe having an intermediate portion spaced laterally from the upper edge of said first flap guide shoe a distance less than the width of a carton and a portion at its outlet end that diverges rapidly in the direction of movement of said cartons relative to said first flap guide shoe, means for guiding the flaps on the first and second end walls to a position between said first and second flap guide shoes and for guiding the flaps on said first and second side walls to the outer sides of said first and second flap guide shoes to straddle the same for support of the carton and to effect lateral separation of said side walls and squaring of the cartons as the cartons are advanced, said end walls swinging relative to said first side wall as the side walls are separated and said intermediate portion of said second flap guide shoe engaging the flap on the second end wall to guide the same to a position extending transverse to said second end wall as the carton is squared.

15. An apparatus for erecting flattened cartons of the type having a first end wall and a first side wall at one side of the flattened carton and a second side wall and a second end wall at the other side of the flattened carton and flaps on the lower ends of the walls comprising, a frame, means on the frame defining first and second lateral carton guides laterally spaced apart a distance corresponding to the width of an opened carton for guiding the cartons along a path, means on the frame for supporting a stack of flattened cartons, means for removing individual cartons from the stack and for advancing the same between said lateral carton guide with said first side wall alongside said first lateral carton guide and with said first end wall at the lead and said second end wall at the trail end of the flattened carton, first and second flap guide shoes extending along a portion of said lateral carton guides with the upper edges thereof disposed adjacent the path of movement of the lower ends of the carton walls, said first flap guide shoe having its upper edge disposed substantially vertically below said first lateral carton guide, said second flap guide shoe having an intermediate portion spaced laterally from the upper edge of said first flap guide shoe a distance less than the width of a carton and a portion at its outlet end that diverges rapidly in the direction of movement of said cartons relative to said first flap guide shoe, means for guiding the flaps on the first and second end walls to a position between said first and second flap guide shoes and for guiding the flaps on said first and second side walls to the outer sides of said first and second flap guide shoes to straddle the same for support of the carton and to effect lateral separation of said side walls and squaring of the cartons as the cartons are advanced, said end walls swinging relative to said first side wall as the side walls are separated and said intermediate portion of said second flap guide shoe engaging the flap on the second end wall to guide the same to a position extending transverse to said second end wall as the carton is squared, and a third flap guide disposed between said first and second flap guide shoes and in the path of movement of the flap on said second end wall for deflecting the flap on said second end wall laterally of the plane of that end wall as the carton is advanced and before the carton is substantially squared.

16. The combination of claim 15 wherein said third flap guide shoe includes a panel attached to said second flap guide shoe and inclined downwardly and inwardly from adjacent the upper edge of said intermediate portion.

17. The combination of claim 15 wherein said third flap guide shoe includes a panel attached to said first guide shoe and spaced below the upper edge thereof, and means for guiding the flap on said second end wall into the space between said first and third flap guide shoes.

18. The combination of claim 15 including a plow extending crosswise between the divergent ends of said first and second flap guide shoes and engageable with the flap on said first end wall for holding that flap inwardly after the carton has been opened and in response to advancement of the carton past said plow.

19. The combination of claim 15 including first and second wedge shaped carton opening members attached to said first flap guide shoe adjacent the inlet end thereof, said first and second wedge shaped members extending laterally of the first flap guide shoe and being spaced apart a distance corresponding to the length of the side walls of the carton to engage the flaps on the first and second end walls and effect initial separation of the first and second side walls as the cartons are advanced therepast.

20. An apparatus for erecting flattened cartons having a first side and a lead wall at one side of the flattened carton, a second side wall and a trailing wall at the other side of the flattened carton, and upper and lower flaps on the upper and lower ends of the walls, said apparatus comprising lateral carton guide means engageable with said first side wall of a flattened carton for guiding the same along a path substantially paralleling said first side wall, means for advancing the carton along said lateral carton guide means, means engageable with the carton as it is advanced along said lateral carton guide means for separating the second side wall from the first side wall to open and erect the carton, and upper and lower flap guide shoes respectively disposed above and below said lateral carton guide means and engageable with the upper flap on the lead wall and the lower flap on the trailing wall to deflect the same at an angle to the plane of the respective wall before the carton has been opened substantially and for guiding those flaps to a position extending transverse to the respective wall as the carton is opened and squared.

21. An apparatus for erecting flattened cartons having a first side and a lead wall at one side of the flattened carton, a second side wall and a trailing wall at the other side of the flattened carton, and upper and lower flaps on the upper and lower ends of the walls, said apparatus comprising lateral carton guide means engageable with said first side wall of a flattened carton for guiding the same along a path substantially paralleling said first side wall, means for advancing the carton along said lateral carton guide means, means engageable with the carton as it is advanced along said lateral carton guide means for separating the second side wall from the first side wall to open and erect the carton, a pair of spaced upper shoes extending generally parallel to said lateral carton guide means and inclined to a plane through said one side wall of the carton to define an upper flap receiving channel therebetween, a pair of spaced lower shoes extending generally parallel to said lateral carton guide means and inclined to a plane through said one side wall of the carton to define a lower flap receiving channel therebetween, means on said upper shoes for guiding the upper flap on said one side wall to the underside of said shoes and for guiding the upper flap on at least the lead wall of the carton into said upper channel, means on said lower shoes for guiding the lower flap on said one side wall into overlying relation with said lower shoes and for guiding the lower flap on at least the trailing wall into said lower channel, said upper and lower shoes respectively deflecting the upper flap on the lead wall and the lower flap on the trailing wall at an angle to the plane of the respective wall before the flattened carton has been opened substantially whereby those flaps extend transverse to the respective wall when the carton is opened and squared.

No references cited.